United States Patent Office 3,524,306
Patented Aug. 18, 1970

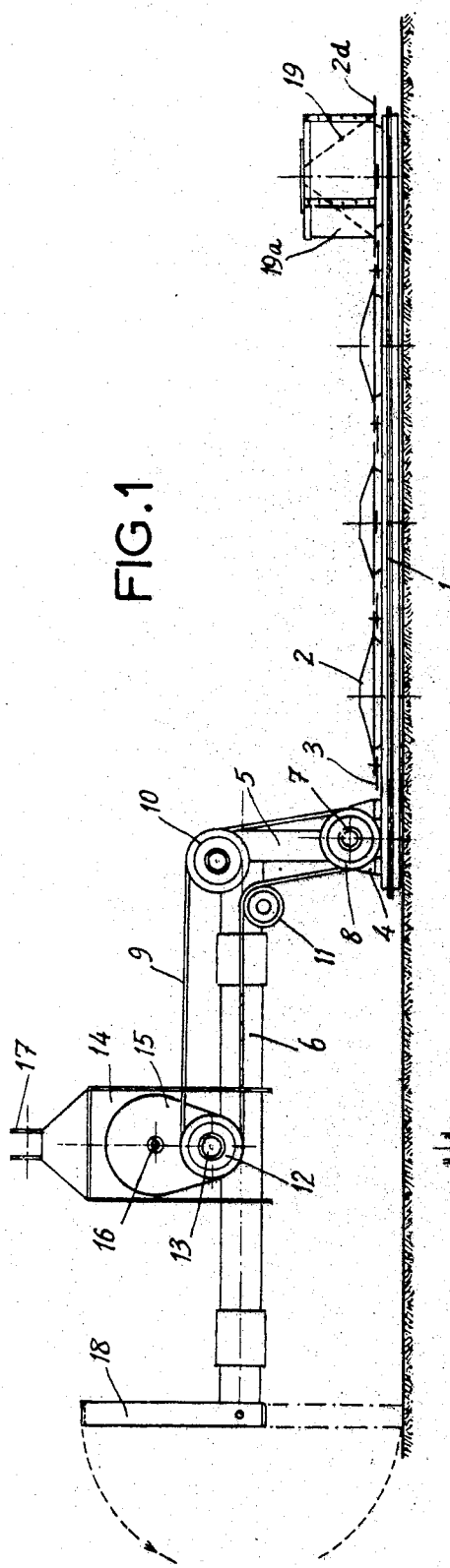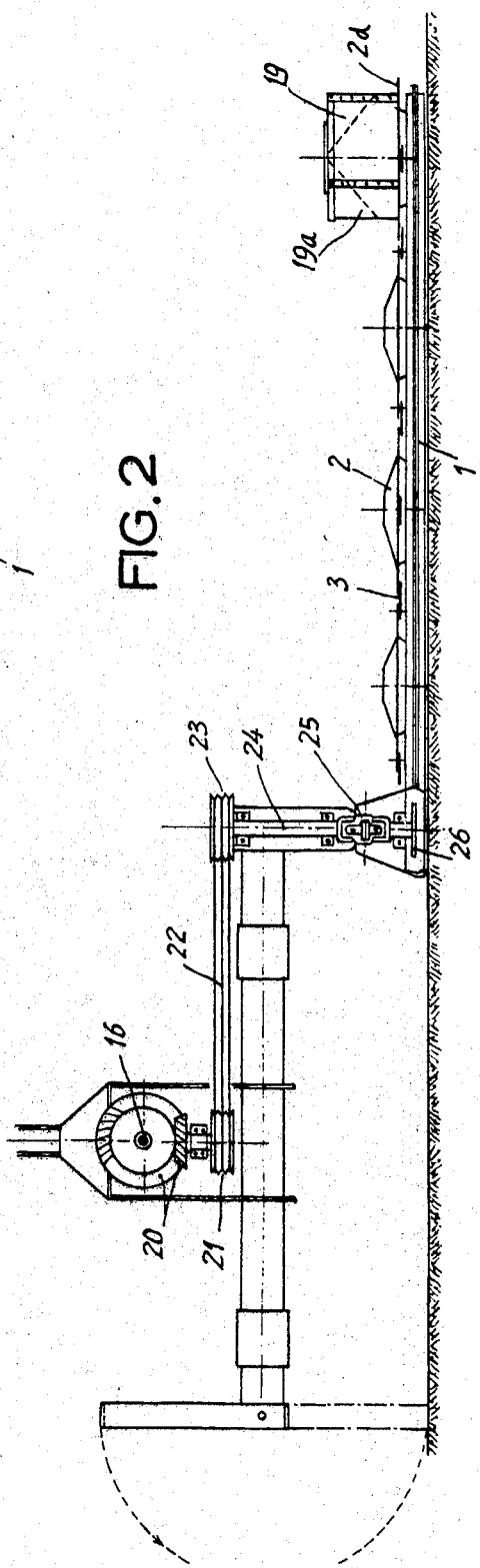

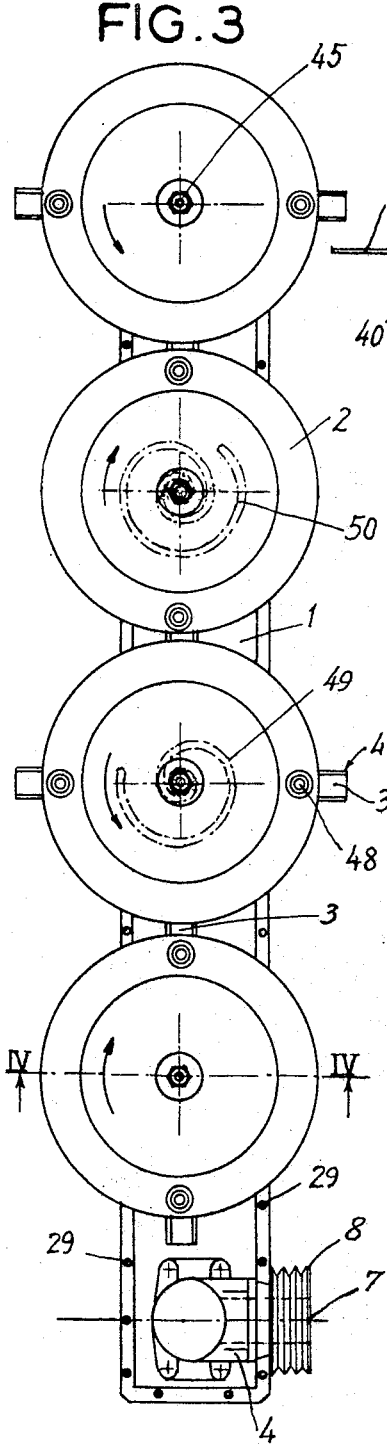
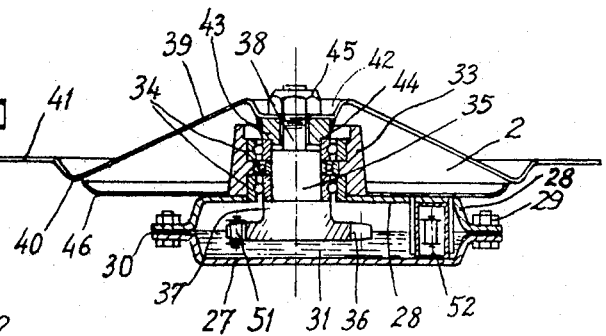
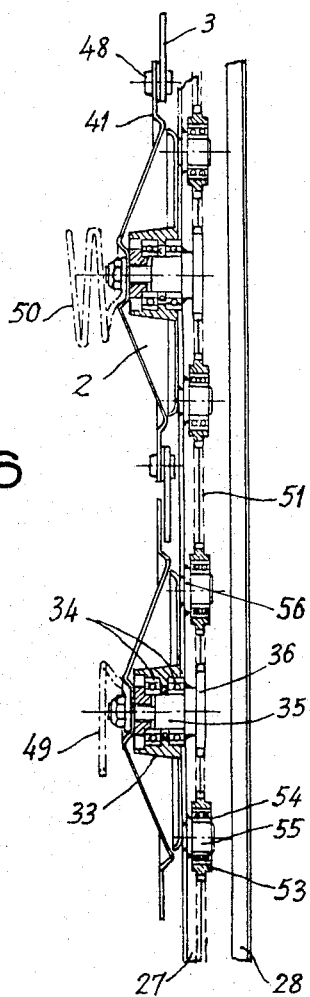

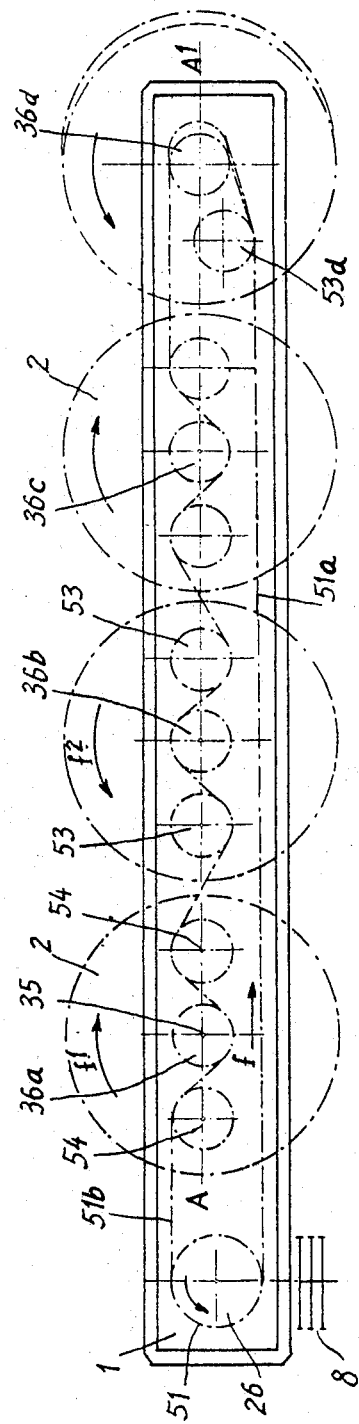

3,524,306
DISK-TYPE MOWING MACHINES
Walter Reber, Saverne, France, assignor to
Kuhn Freres & Cie, Paris, France
Filed Feb. 5, 1968, Ser. No. 703,082
Claims priority, application France, Feb. 13, 1967,
94,661
Int. Cl. A01d *35/26, 57/28*
U.S. Cl. 56—25.4                                    10 Claims

ABSTRACT OF THE DISCLOSURE

The mowing machine has supporting disks of cutting elements driven along a circular path, and comprises a pivoting bar consisting of a closed, oil-tight case acting as a carrier to the said disks and to other elements necessary for performing the mowing operation, said case containing in an oil sump the members transmitting the circular motion to said cutters driven from beneath, and supporting the main drive member of this transmission of which the axis is coincident with the pivot axis of said bar.

---

The present invention relates to a rotary-disk mowing machine. In conventional mowing machines a blade is reciprocated under teeth secured to a bar connected through a main frame structure to the tractor vehicle. Due to its reduced vertical dimension, this machine is advantageously flexible, both in operation and during its transport. However, it is objectionable in that it is liable to become clogged with the mowed material, thus requiring frequent hold-ups for cleaning and dismantling the blades. Moreover, the cut grass falls backwards by pivoting about the lower end of its stem, thus preventing a rational operation of combined treatment machines.

It is the object of the present invention to provide a rotary mowing machine equipped with cutting members to which a circular motion is imparted, and which is free of the drawbacks mentioned hereinabove while having a greater efficiency and a low vertical dimension so as to preserve all the advantageous features of conventional mowing machines.

This mowing machine comprising a bar connected to a main frame structure is characterised in that said bar consists of a closed case acting as a carrier to the members supporting in turn the cutting elements and other elements necessary for performing the cutting operation, said case containing in a lubricating sump the members for transmitting the rotary motion to the cutting elements driven from beneath and supporting the main driving member of this transmission having its axis coincident with that of the pivoting movement of said bar.

According to other features characterising this invention, the arrangement comprises an even number of cutter supports consisting of substantially conical disks having their outer peripheral portion provided with one or a plurality of cutting elements each secured thereto by means of a cylindrical fastening member, each pair of adjacent disks revolving in convergent or opposite directions.

Other advantages and features of this invention will appear as the following description proceeds with reference to the accompanying drawings illustrating diagrammatically by way of example a typical form of embodiment of a mowing machine constructed according to the teachings of this invention, with various modifications.

In the drawings:

FIG. 1 is an elevational view of the mowing machine as seen from the rear;

FIG. 2 shows the same machine with a modified arrangement of the driving transmission;

FIG. 3 is a plan view of the bar of the machine;

FIG. 4 is a cross-section taken on a larger scale along the line IV—IV of FIG. 3;

FIG. 5 shows a modified form of embodiment of the case which comprises a box-sectioned beam;

FIG. 6 is a longitudinal section showing on a larger scale a pair of cutting-element supports carried by the bar, the lower section or half of the case being detached from the upper portion;

FIG. 7 is a diagrammatic plan view showing the chain transmission arrangement inside the case;

Figure 8:
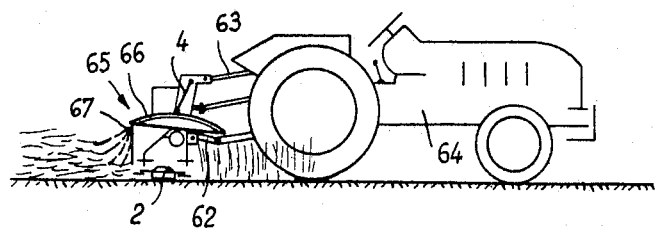
FIGS. 8 to 10 show respectively in side view, rear view and plan view a mowing machine towed by a tractor and equipped with protection means.

Referring first to FIG. 1, it will be seen that the improved rotary-disk mowing machine according to this invention comprises a bar 1 carrying a number of disk-shaped supports 2 to which cutting members 3 are secured, and the frame structure 4 of an angle member for driving the bar-carried supports, which is connected by means of an upright 5 to the main frame structure 6 of the mowing machine. Secured to the shaft 7 of said angle driving member is a driving pulley 8 of the main transmission 9, the latter being of the V-belt type. This transmission passing over angle pulleys 10 and 11 is driven through a pulley 12 keyed on a shaft 13 rotatably mounted in bearings supported by a case 14. The last pulley 12 is driven in turn by a step-up transmission 15 driven from a shaft 16 connected to the driving shaft of the tractor vehicle (or a self-powered machine) illustrated in FIGS. 8 to 10. A coupling rod connects the strap 17 of case 14 to the tractor vehicle. Adequate linkage means (not shown in the drawings) are provided for coupling the main body of the mowing machine to the tractor, and a prop 18 is also provided for supporting on the ground the end of the main body of the machine when the latter is uncoupled from the tractor.

An overlying frustoconical member 19 (in dotted lines) or a deflector 19a is mounted on the last disk 2d of the bar, at the end thereof opposite to the driven end, to constitute a swath during the mowing.

In a modified arrangement illustrated in FIG. 2 the shaft 16 drives through the medium of bevel gear means 20 a pulley 21 of a belt transmission 22 having its driven pulley 23 rigid with the shaft 24 of a double universal joint 25 driving the main pinion 26 of the transmission system of bar 1. The member 19 supported by the last disk 2d has a cylindroconical configuration in this arrangement.

In the two above-described examples the bar 1 is adapted to pivot about an axis coincident with that of the main drive 7 with the axis of the permissible bending movements of the double universal joint 25, thus ensuring the drive in various angular positions of the bar 1.

In the arrangement illustrated in FIGS. 3 and 4 the bar 1 is a fluid-tight closed case consisting of two similar members 27 and 28 for example of pressed metal sheet or section, having their bent flanges or marginal portions assembled by means of bolts 29 with the interposition of a sealing gasket 30. Thus the case provides a substantially parallelepipedic inner space containing a lubricating oil sump 31. This design facilitates the dismantling of the case and permits a quick replacement of the lower element 27 normally worn by its frequent frictional contact with the ground.

Alternatively, as shown in FIG. 5, a closed section 32 providing an inner space substantially similar to that of the case illustrated in FIG. 4 may constitute the bar-forming case. The ends of this section are then closed in any suitable manner in order to make the case fluid-tight after the transmission has been mounted therein.

Easily-detachable bearing supports 33 provided with ball-bearings 34 are secured to the upper element 28 of the case formed with adequate apertures for permitting the mounting of these bearings. A shaft 35 rigid with a driving sprocket 36 dipping in the oil sump 31 is mounted in the bearings 34. A shoulder 37 of said sprocket bears against the inner race of the lower bearing. The upper portion of shaft 35 has a screw-threaded extension 38 on which the support 2 of the cutting elements is mounted. This support is disk-shaped and has a frustoconical portion 39 providing a circular groove 40 between this portion and an outer flat annular flange 41. The central portion of the frustoconical portion 39 constitutes a cup 42 formed with a central hole and welded to a boss 43 having a shoulder 44 resting on the inner race of the upper bearing 34. A nut 45 is secured to the screw-threaded shaft extension 38 in order rigidly to assemble the shaft extension 38 and the disk 2. A shallow tray or like dish-shaped member 46 secured to the case under the frustoconical portion 39 of the disk protects the inner portion thereof against the ingress of cut grass or foreign bodies.

As illustrated in FIGS. 3 and 6 two cutting elements 3 formed with a sharp edge 47 on either side are mounted in diametrally opposed positions and each secured by a single cylindrical fastening member 48. The number of cutting element is immaterial. The cutting elements of any pair of adjacent disks are off-set angularly, for example by about 90°.

The disks may be provided with cutting members affording an improved aeration of the swath during the mowing operation, and also a satisfactory tedding of the previously cut grass. These cutting members are either rigid, in the form of a flat spiral 49, or elastic in the form of a helical spiral 50, made for example from round-sectioned steel stock and clamped on the disk by means of the top nut 45.

The sprockets 36 driving the disks 2 are drivingly engaged as shown diagrammatically in FIGS. 4, 6 and 7 by an endless chain 51, for example of the roller type, driven in turn from the main sprocket 26 responsive to the angle transmission 4 as shown in FIG. 1 or to the shaft 24 of the universal joint 25 as shown in FIG. 2.

The driving span 51a of the chain which moves in the direction of the arrow f of FIG. 7 is housed in a guide case 52 secured to the upper element 28 of the case constituting the bar 1, as shown in FIG. 4.

Counter or guide rollers 53, whether plain or toothed, are disposed on either side of the driving sprockets 36a, 36b and 36c. They are mounted by means of bearings 54 on the rotary shafts 55 extending at right angles to the case element 28 and having their axes aligned with the line A–A1 containing the axes of the shafts 35 of sprockets 36.

The rotary shafts 55 are welded to the upper element 28 of the case; washers 56 are interposed between the inner wall of element 28, to which they are welded, and the inner races of bearings 54.

The guide rollers 53 permit on the other hand obtaining the necessary angular amplitude of the chain arc surrounding the sprockets by causing the chain to pass alternatively over one or the other side of the driving sprockets 36 and to drive two adjacent sprockets in opposite directions $f_1$ and $f_2$, so that each pair of adjacent disks 2 rotate in convergence or in opposite directions and compel the cut grass to fall forwards. The driving sprocket 36d of the last disk is preceded by only one guide roller 53d disposed in an eccentric position in relation to the line A–A1 containing the axes, so that the driving span 51a of the chain be approximately parallel to the line of axes A–A1 and engages the first-driven sprocket 36d along an arc of about 180° to permit the return movement of the slack span 51b of the chain.

The transmission chain 51 may be tensioned by either displacing the last driving sprocket 36d in a longitudinal direction, i.e. along the line A–A1, as shown in FIG. 7, or shifting the main sprocket 26 in a direction parallel to this line. The same result may also be obtained by moving one or more guide rollers 53 in a direction across the line of axes A–A1.

Of course, the number of pairs of disks supporting the cutting elements, which is two in the examples described and illustrated herein, is given by way of example only and any other number of such pairs can be used at will, according to the size and mode of operation of the machine.

Figure 9:
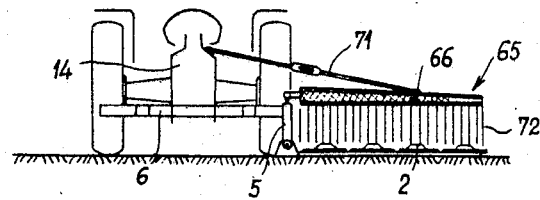
Figure 10:
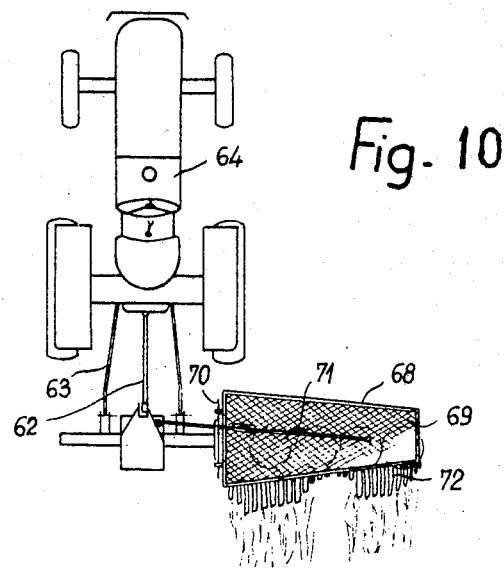

In order to ensure an efficient protection against earth fragments, stone splinters and the like, both for the area at the rear of the mowing machine and driver, means are provided as shown in FIGS. 8 to 10. In these figures it will be seen that the mowing machine is coupled, for example, by means of poles 62 to the tow bar 63 of a tractor 64.

These protection means consist of a shield 65 of plastic, rubber, sheet-metal or wire-mesh, comprising an upper portion 66 and a rear portion 67. The first portion 66 comprises, for example, a frame 68 made of adequate sections and covered with a preferably convex grid, wire-mesh or metal sheet 69 overlying the disks 2 of the mowing machine. A hinge pin 70 rigid with the upright 5 of the main frame structure is provided for fastening the frame thereto and permitting the pivotal movements thereof. An adjustable tension rod 71 is provided for fastening the protection device to the case 14 and adjusting at will the inclination of this device in relation to the ground. The rear portion 67 consists of rods or blades 72 preferably of flexible nature, secured to the rear end of the frame and adapted to be deflected rearwardly to accommodate the contour of the swath.

Of course, this invention should not be construed as being limited by the specific forms of embodiment shown and described herein, since many modifications may be brought thereto without departing from the spirit and scope of the invention as set forth in the appended claims:

1. A rotary-disk mowing machine comprising a plurality of rotating disk-shaped supports each having a frustoconical portion, at least two outwardly directed cutting elements mounted on said supports to be driven along circular paths, transmission means drivingly connected to said supports and comprising driving and guiding elements rigid with shafts fixed to said supports and intermediate transmission elements, a main drive supported by a frame of the machine and operatively connected to a driving member connected to said main drive and driving said transmission means, a pivoting bar comprising a two-part case containing said transmission means and an oil lubricating sump and supporting said driving member, bearings and supports of said transmission driving and guiding elements and members for performing the mowing operation, the upper part of said two-part case forming an assembly unit supporting all said transmission bearings, driving and guiding elements and said members for performing the mowing operation, the lower part of said two-part case trailing on the ground, and protection member means to protect said bar and said disk-shaped supports.

2. A mowing machine according to claim 1, wherein said upper and said lower parts of said case consist of similar sections having flanged edges, gasket means interposed between said flanged edges to form a flat substantially parallelipipedic bar.

3. A mowing machine according to claim 1, wherein said driving member supported by said bar comprises a double universal joint connected at one end to said transmission means contained in said bar and connected at the other end to a shaft of said main drive of the machine.

4. A mowing machine according to claim 3, wherein said bar is adapted to pivot about an axis coincident with the axis of the permissible bending movements of said universal joint.

5. A mowing machine according to claim 1, wherein said members for performing the mowing operation are spiral shaped members adapted to aerate the cut grass and fixed to said rotating supports on the bar.

6. A mowing machine according to claim 2, further comprising shallow disk-shaped trays secured to said upper part beneath the frusto-conical portion of said disk-shaped supports to protect their inner portion against the ingress of grass and like foreign bodies.

7. A mowing machine according to claim 1, wherein said protection member means comprises a sheld disposed in a frame above said rotating supports and secured to the machine and is adapted to pivot transversely to the direction of travel of the machine.

8. A mowing machine according to claim 7, wherein said shield is made of material selected from the group consisting of plastic, rubber, sheet iron and metal lattice.

9. A mowing machine according to claim 7, wherein said protecting member means further comprises a rear portion which consists of depending surface means secured to the rear end of said shield frame and adapted to yield rearwardly to accommodate the swath contour.

10. A mowing machine according to claim 7, wherein an adjustable tension rod connects said protection member to said machine frame and permits varying of the inclination of said protection member to the ground surface.

References Cited

UNITED STATES PATENTS

| | | | |
|---|---|---|---|
| 138,192 | 4/1873 | Pomeroy | 56—295 |
| 262,637 | 8/1882 | Blanchard | 56—295 |
| 914,492 | 3/1909 | Johnston | 56—295 |
| 969,817 | 9/1910 | Weathern | 56—295 |
| 2,625,784 | 1/1953 | Kelsey | 56—192 |
| 2,793,484 | 5/1957 | McNeill et al. | 56—25.4 |

RUSSELL R. KINSEY, Primary Examiner

U.S. Cl. X.R.

56—192, 295